US010015144B2

United States Patent
Katz et al.

(10) Patent No.: US 10,015,144 B2
(45) Date of Patent: Jul. 3, 2018

(54) METHOD AND SYSTEM FOR PROTECTING DATA USING DATA PASSPORTS

(71) Applicant: Schedule1 Inc., Toronto (CA)

(72) Inventors: Jacob Katz, Toronto (CA); Kevin Ellison, Toronto (CA)

(73) Assignee: Schedule1 Inc., Toronto (CA)

( * ) Notice: Subject to any disclaimer, the term of this patent is extended or adjusted under 35 U.S.C. 154(b) by 327 days.

(21) Appl. No.: 14/764,775

(22) PCT Filed: Jan. 31, 2014

(86) PCT No.: PCT/CA2014/050063
§ 371 (c)(1),
(2) Date: Jul. 30, 2015

(87) PCT Pub. No.: WO2014/117275
PCT Pub. Date: Aug. 7, 2014

(65) Prior Publication Data
US 2015/0372991 A1    Dec. 24, 2015

Related U.S. Application Data

(60) Provisional application No. 61/759,060, filed on Jan. 31, 2013.

(51) Int. Cl.
*H04L 29/06* (2006.01)
*H04L 9/08* (2006.01)
*H04L 29/08* (2006.01)

(52) U.S. Cl.
CPC ........ *H04L 63/0428* (2013.01); *H04L 9/0819* (2013.01); *H04L 9/0861* (2013.01); *H04L 63/08* (2013.01); *H04L 67/10* (2013.01)

(58) Field of Classification Search
USPC ........................................................ 713/168
See application file for complete search history.

(56) References Cited

U.S. PATENT DOCUMENTS 8,295,492 B2 * 10/2012 Suarez ............... G06F 21/33
380/286
2005/0138374 A1 * 6/2005 Zheng ............... H04L 9/0894
713/166

(Continued)

FOREIGN PATENT DOCUMENTS

| EP | 1696602 A1 | 8/2006 |
| EP | 2477375 A1 | 7/2012 |
| WO | 2009070075 A1 | 6/2009 |

OTHER PUBLICATIONS

J. Atwood; "Automated Key Management for Router Updates," 2009 First International Conference on Emerging Network Intelligence; Oct. 11-16, 2009; pp. 77-81 (5 pages).

(Continued)

*Primary Examiner* — William J. Goodchild
(74) *Attorney, Agent, or Firm* — FBFK PC

(57) ABSTRACT

A method for transmitting data involves receiving the data, identifying, by a sender system, a first data element in the data to protect, encrypting, by the sender system, the first data element with a sender session key, generating, by the sender system, a combined key using a receiver key value and a sender compartmentalization key (SK). The method also involves encrypting, by the sender system, the sender session key using the combined key to obtain an encrypted session key, generating, by the sender system, a data passport comprising the encrypted session key, a dictionary classification key (DK) index, a SK index, and a receiver compartmentalization key (RK) index, generating, by the sender system, protected data comprising the data passport and the encrypted first data element, and transmitting, by the sender system and across a network, the protected data to a receiver system.

24 Claims, 6 Drawing Sheets

(56) References Cited

U.S. PATENT DOCUMENTS

2006/0291664 A1* 12/2006 Suarez .................... G06F 21/33
                                                        380/286
2010/0268937 A1* 10/2010 Blom .................... H04L 63/061
                                                        713/153
2011/0055567 A1*  3/2011 Sundaram ............. H04L 9/0825
                                                        713/169
2011/0258326 A1* 10/2011 Hu ........................ H04L 63/062
                                                        709/226

OTHER PUBLICATIONS

International Search Report issued in corresponding application No. PCT/CA2014/050063, dated Jul. 14, 2014 (3 pages).
Written Opinion issued in corresponding application No. PCT/CA2014/050063, dated Jul. 14, 2014 (3 pages).
Extended European Search Report for Patent Application No. 14746323.6, dated Aug. 22, 2016, 7 pages.
Canadian Office Action for Canadian Patent Application No. 2,938,166, dated Apr. 21, 2017, 4 pages.

* cited by examiner

METHOD AND SYSTEM FOR PROTECTING DATA USING DATA PASSPORTS

CROSS-REFERENCE TO RELATED APPLICATIONS

This application is a national phase application of international application PCT/CA2014/050063, having an international filing date of Jan. 31, 2014. International application PCT/CA2014/050063 claims priority to U.S. Provisional Application No. 61/759,060 filed on Jan. 31, 2013, entitled "METHOD AND SYSTEM FOR PROTECTING DATA USING DATA PASSPORTS." Accordingly, the present national phase application also claims priority under 35 U.S.C. § 119(e) to U.S. Provisional Application No. 61/759,060. The disclosure of the U.S. Provisional Application is incorporated herein by reference in its entirety.

BACKGROUND

Data protection and security is a multibillion dollar a year industry, yet data breaches happen frequently. This is due to many reasons: the inherent difficulty in protecting data, competing standards of protection, many different hardware and software solutions, as well as the greatly varying skill levels of the individuals or organizations implementing the protection. Thus, one of the most common ways is to simply protect the channel through which data passes (i.e., protect the phone line, etc). However, if the channel is compromised, then all the data may be easily accessed. The next logical step is to secure some, or all, of the data using a key.

Presently, symmetric keys are primarily exchanged in three ways (although variations exist): (1) encrypting the symmetric key using an asymmetric key before sending to the other side; (2) encrypting the symmetric key under a second symmetric key before sending to the other side; and (3) delivering the symmetric key using paper. Each of these common methods has a variety of problems. One of the most challenging problems is that a direct relationship must be established between the two parties to exchange symmetric keys. Establishing and managing this direct relationship is challenging, and the challenge is multiplied when keys expire quickly and/or many users are using the system. Other problems include slow transfer of keys (paper deliver), and/or obvious "break" points where the system has a weak point(s).

Even if the exchange of keys can be well implemented, the keys must be managed and stored securely. The management system must keep track of what key is used for which data. Typically, a given key may be selected to protect data based on business logic. Both the sender and the receiver must know what the business logic is to successfully determine what the key should be for a given piece of data. To do this, both sides must have a predefined relationship in order to exchange the necessary information about the key selection methodology and business logic. Problems with this implementation include a component breaking, encountering a bug or some other issue, which may result in the data being "lost" forever in an encrypted state.

For example, U.S. Pat. No. 8,295,492 ("Suarez") is directed towards an automated key management system. Suarez is able to automatically generate cryptographic keys, as well as automatically distribute the keys. However, Suarez falls victim to the various flaws described above.

SUMMARY

In general, in one aspect, the invention relates to a method and system for transmitting data. The method involves receiving the data, identifying, by a sender system, a first data element in the data to protect, encrypting, by the sender system, the first data element with a sender session key, generating, by the sender system, a combined key using a receiver key value and a sender compartmentalization key (SK). The method also involves encrypting, by the sender system, the sender session key using the combined key to obtain an encrypted session key, generating, by the sender system, a data passport comprising the encrypted session key, a dictionary classification key (DK) index, a SK index, and a receiver compartmentalization key (RK) index, generating, by the sender system, protected data comprising the data passport and the encrypted first data element, and transmitting, by the sender system and across a network, the protected data to a receiver system.

In general, in one aspect, the invention relates to a non-transitory computer readable storage medium comprising computer readable code for sending data. The computer readable code when executed includes functionality to: receive the data; identify a data element in the data to protect; encrypt the data element with a sender session key; generate a combined key using a receiver key value and a sender compartmentalization key (SK); encrypt the sender session key using the combined key to obtain an encrypted session key; generate a data passport comprising the encrypted session key, a dictionary classification key (DK) index, a SK index, and a receiver compartmentalization key (RK) index; generate protected data comprising the data passport and the encrypted data element; and transmit the protected data to a receiver system.

In general, in one aspect, the invention relates to a method and system for receiving protected data. The method involves receiving, by a receiver system via a network and from a sender system, the protected data comprising a data passport and an encrypted data element; obtaining, by the receiver system, a dictionary classification key (DK) index and a sender compartmentalization key (SK) index from the data passport; sending, by the receiver system and across the network, a request for a sender key value to a key management system (KMS), wherein the request comprises the DK index and the SK index; receiving, by the receiver system via a network and in response to the request, the sender key value; obtaining, by the receiver system, the receiver compartmentalization key (RK) from a receiver key repository using an RK index, wherein the RK index is obtained form from the data passport; generating, by the receiver system, a combined key using the sender key value and the RK; decrypting, by the receiver system, an encrypted session key using the combined key to obtain a session key; decrypting, by the receiver system, the encrypted data element to obtain a data element using the session key; generating, by the receiver system, data using the data element; and transmitting the data to an application on the receiver system.

In general, in one aspect, the invention relates to a non-transitory computer readable storage medium comprising computer readable code for receiving protected data. The computer readable code when executed includes functionality to: receive the protected data comprising a data passport and an encrypted data element; obtain a dictionary classification key (DK) index and a sender compartmentalization key (SK) index from the data passport; send a request for a sender key value to a key management system (KMS), wherein the request comprises the DK index and the SK index; receive, in response to the request, the sender key value; obtain the receiver compartmentalization key (RK) from a receiver key repository using an RK index, wherein the RK index is obtained form the data passport; generate a combined key using the sender key value and the RK; decrypt an encrypted session key using the combined key to obtain a session key; decrypt the encrypted data element to obtain a data element; generate data using the data element; and transmit the data to an application on a receiver system.

DETAILED DESCRIPTION

Figure 1:
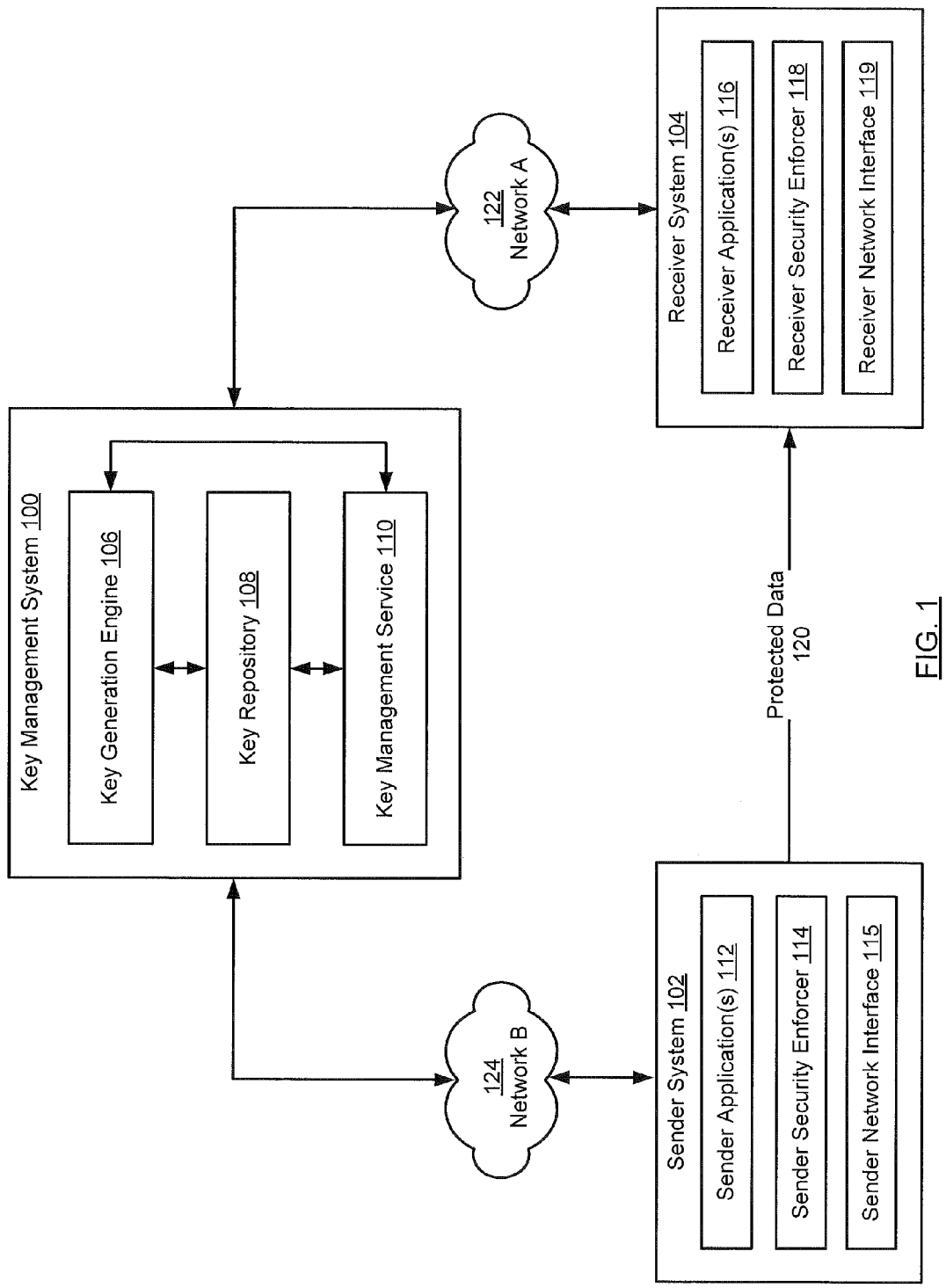
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to protecting data (or particular data elements therein) while stored and/or during transmission and/or in-transit. More specifically, embodiments of the invention relate to using session keys to secure data (or particular data elements therein) and Key Management System (KMS) keys and compartmentalization keys to secure the session key as well as other encryption keys used to implement the invention. Further, embodiments of the invention use a data passport that includes the encrypted session key along with indices specifying which keys (i.e., dictionary classification keys, compartmentalization keys, etc.) were used to encrypt the session key. The data passport is communicated along with the encrypted data (or portions thereof) to a receiver system. The receiver system includes functionality to decrypt the encrypted session key using the data passport and to decrypt the encrypted data (or portions there of) using the decrypted session key.

In one embodiment of the invention, embodiments of the invention protect data (or particular data elements therein) while stored and/or during transmission and/or in-transit. In other words, rather than protecting the channel of transmission (i.e., a secure telephone line, etc), the data itself is protected. Further, the entire management of the necessary cryptographic keys is automatic and not dependent on the individuals implementing the system. As used herein, data refers to any information that may be transmitted. Examples of data include, but are not limited to, files, portions of files, messages, and portions of messages.

FIG. 1 shows a system in accordance with one or more embodiments of the invention. As shown in FIG. 1, the system includes a key management system (KMS) (100), a sender system (102) and a receiver system (104). Each of these components is described below.

In one or more embodiments of the invention, the system depicted in FIG. 1 may take the form of a networked system where one or more of the components communicate by through a network, such as network A (122) or network B (124). A network system may be formed by one or more computers, laptops, smartphones, servers, or other similar devices (i.e., devices with a processor) that are communicatively connected using wired or wireless components. For example, the wired components may include telephone lines, fiber, and/or any other electrical or optical cable(s). For example, the wireless components may include a Wi-Fi connection, a satellite connection, wireless telecommunication connections (e.g., 3G, 4G, etc.), and/or any other suitable connection. In one or more embodiments of the invention, the various wired and/or wireless connections may be secured through physical means (e.g., a secured wired connection that is inaccessible to others, etc.) and/or software methods (e.g., Transportation Layer Security (TLS), Secure Sockets Layer (SSL), etc.). The various computing devices may communicate by sending packets of data amongst themselves. The data packets are routed via routers, switches, and/or other components, from the transmitting device to a receiving device. The data packets may be formatted or organized in any manner now known or later developed, such as Transmission Control Protocol (TCP) of the Internet Protocol (IP) suite. In one or more embodiments of the invention, portions of the data packets transmitted between devices may represent encrypted data, as described below. Alternatively, portions of the data packets may represent un-encrypted data. Using the method of the invention, described below, a networked system is able to encrypt, transmit, and decrypt data without regard for whether the transmission lines are secured, and with a simple, automated key management system.

The KMS (100) includes a key generation engine (106), a key repository (108), and a key management service (110). The key generation engine (106) is configured to generate dictionary classification keys. Further, the key generation engine may be configured to generate public and private key pairs and/or symmetric keys. The key generation engine (106) may be implemented using any known key generation techniques without departing from the invention.

The key repository is configured to store the keys (discussed above) generated by the key management engine as well as sender compartmentalization keys and receiver compartmentalization keys sent to it by a sender security enforcer (114) and/or a receiver security enforcer (118). The key management service (110) is configured to request that the key generation engine generate new keys and to service requests for various keys (as described in FIGS. 4 and 5 below). Further, the key management service (110) is configured to authenticate any sender system or receiver system that requests or sends a key(s) and to securely transmit keys or key values (described in FIGS. 4 and 5) to/from the sender system and the receiver system.

In one embodiment of the invention, the KMS (100) is any physical system that includes functionality to implement the key generation engine, the key repository, and the key management service. The physical system may be a computer, laptop, server, smartphone, or other device. In one embodiment of the invention, the KMS (100) may include a processor (not shown), memory (not shown), and persistent storage (not shown). KMS (100) may be located on a separate device from sender system (102) and/or receiver system (104), and may be communicatively connected via wired and/or wireless components to form a networked system (using, for example network A (122) and/or network B (124)) that is able to encrypt, transmit, and decrypt data. Alternatively, various components of the KMS may be distributed across multiple physical systems.

Figure 3:
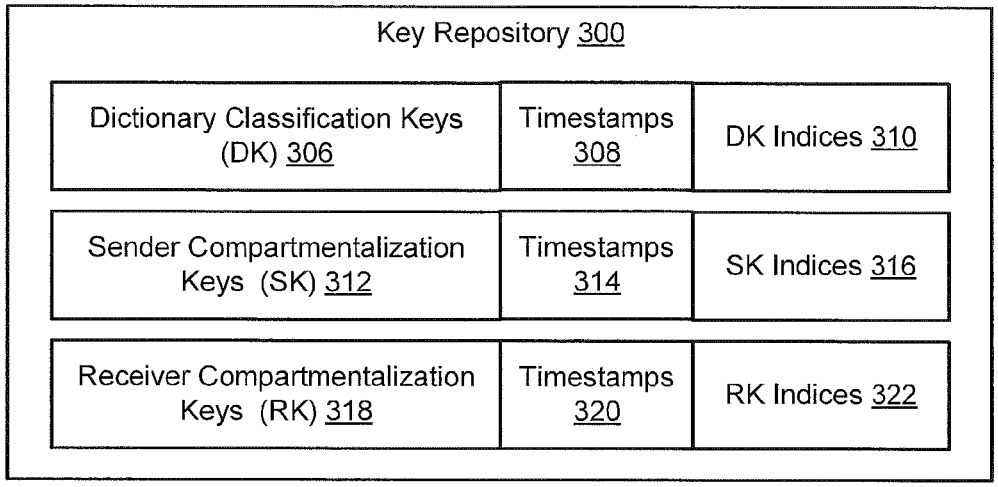
FIG. 3 shows data structures in accordance with one or more embodiments of the invention.
Figure 3:
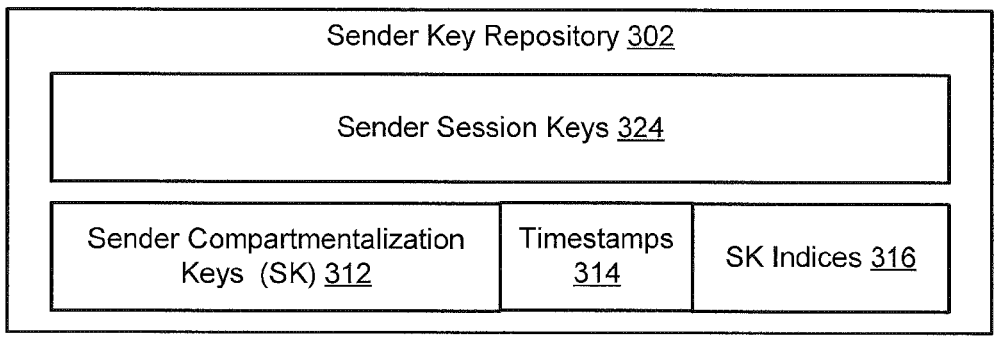
Figure 3:
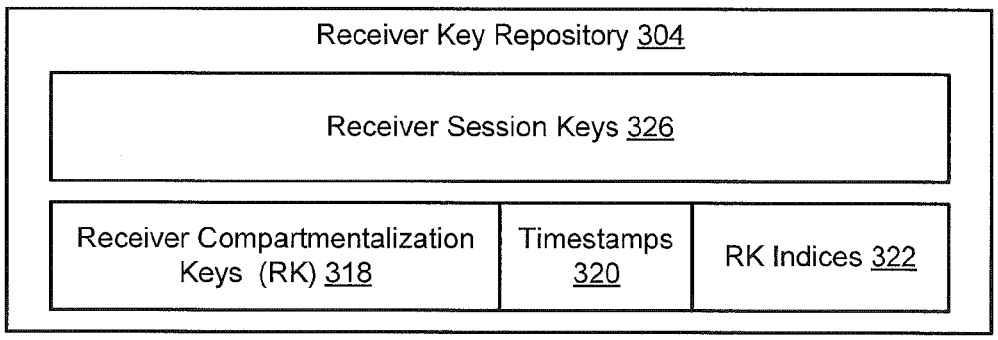
Figure 4:
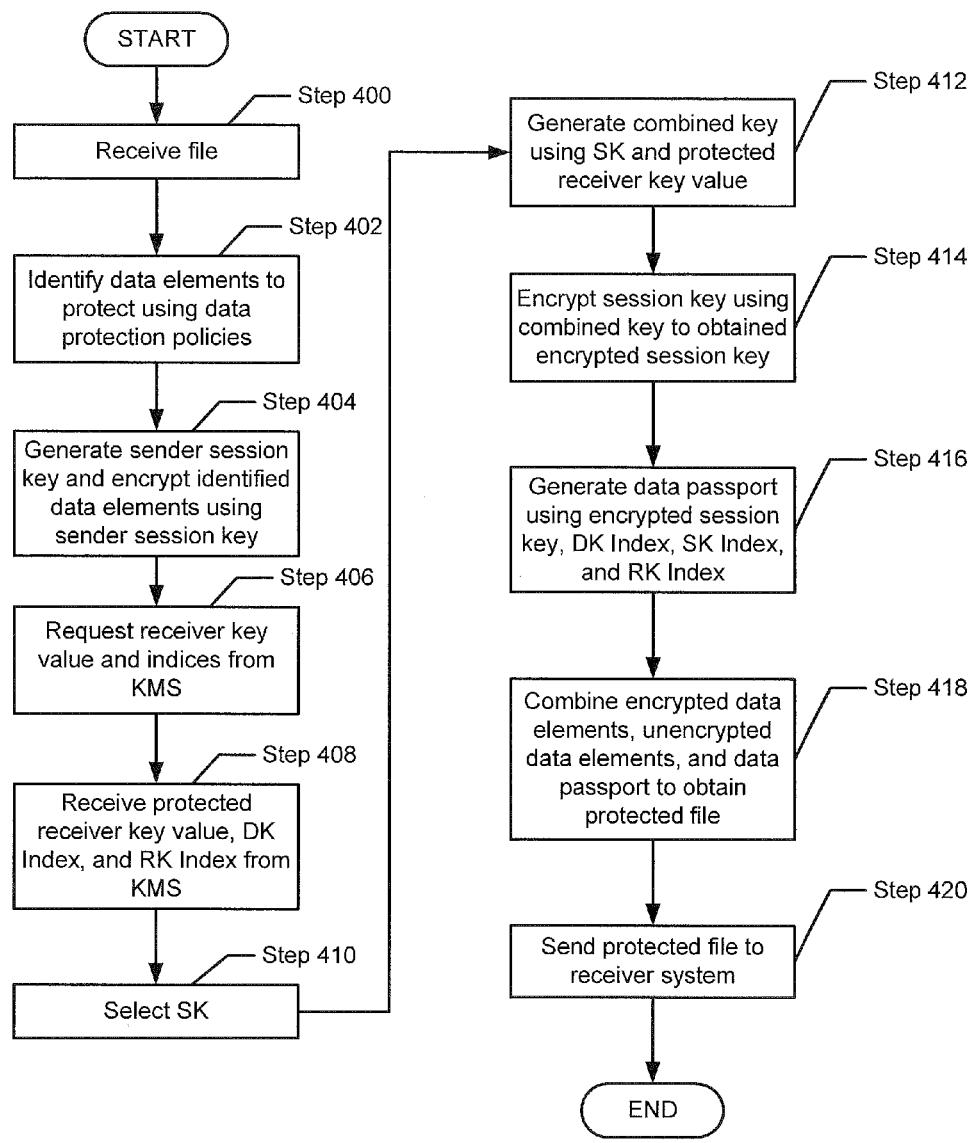
FIG. 4 shows a flow chart for protecting data in accordance with one or more embodiments of the invention.

The sender system (102) includes a sender security enforcer (114) configured to generate, send, and store sender compartmentalization keys and to protect the data (or portions thereof) based on enterprise defined security policies as described in FIG. 4 and to transmit (typically using the networked system described above) the protected data (120) to the receiver system. Additional detail about the sender security enforcer and the nature and structure of the protected data (120) is provided in FIGS. 2 and 3. The sender system further includes functionality to execute one or more sender applications (112). The sender application(s) (112) may be user-level applications and/or kernel-level applications.

In one embodiment of the invention, the sender system (102) is any physical system that includes functionality to implement the sender security enforcer and execute one or more applications. The physical system may be a computer, laptop, server, smartphone, or other device. In one embodiment of the invention, the sender system (102) may include a processor (not shown), memory (not shown), and persistent storage (not shown). Sender system (102) may be located on a separate device from KMS (100) and/or receiver system (104), and may be communicatively connected using a sender network interface (115), which may interface via wired and/or wireless components to form a networked system able to encrypt, transmit, and decrypt data. Alternatively, various components of the sender system may be distributed across multiple physical systems.

Figure 5:
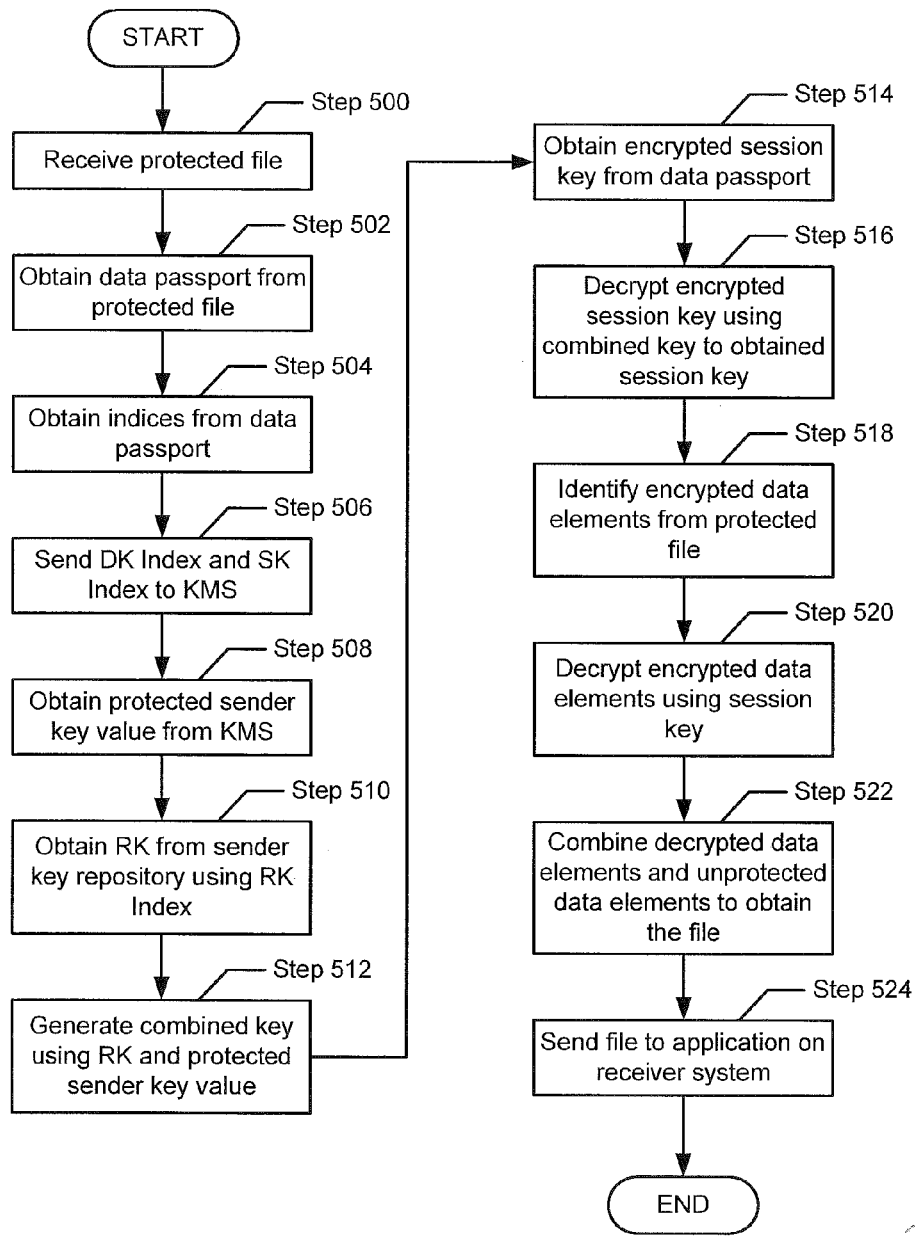
FIG. 5 shows a flowchart for decrypting protected data in accordance with one or more embodiments of the invention.

The receiver system (104) includes a receiver security enforcer (118) configured to generate, send, and store receiver compartmentalization keys and to decrypt the encrypted data (or portions thereof) based on enterprise defined security policies as described in FIG. 5. Additional detail about the receiver security enforcer is provided below in relation to FIG. 2. The receiver system further includes functionality to execute one or more receiver applications (116). The receiver application(s) (116) may be user-level applications and/or kernel-level applications.

In one embodiment of the invention, the receiver system (104) is any physical system that includes functionality to implement the receiver security enforcer and execute one or more applications. The physical system may be a computer, laptop, server, smartphone, or other device. In one embodiment of the invention, the receiver system (104) may include a processor (not shown), memory (not shown), and persistent storage (not shown). Receiver system (104) may be located on a separate device from KMS (100) and/or sender system (102), and may be communicatively connected using a receiver network interface (119), which may interface via wired and/or wireless components to form a networked system able to encrypt, transmit, and decrypt data. Alternatively, various components of the receiver system may be distributed across multiple physical systems.

The KMS (100) may communicate with the sender system and/or receiver system using any wired and/or wireless communication infrastructure and/or protocols. Further, the sender system and the receiver system may communicate with each other using any wired and/or wireless communication infrastructure and/or protocols.

In one embodiment of the invention, all communication between the KMS and the sender system is performed in a secure manner using, for example, a secure communication channel that supports authentication and/or confidentiality, e.g., SSL/TLS. In one embodiment of the invention, all communication between the KMS and the receiver system is performed in a secure manner using, for example, SSL/TLS.

While FIG. 1 shows one embodiment of the invention that includes a single KMS, a single sender system and a single receiver system, the invention is not limited to the system architecture shown in FIG. 1. In particular, the invention may have multiple sender systems, receiver systems, and multiple key management systems. Further, a single system may include functionality to act as both a sender system (i.e., perform the steps described in FIG. 4) and as a receiver system (i.e., perform the steps described in FIG. 5).

Figure 2:
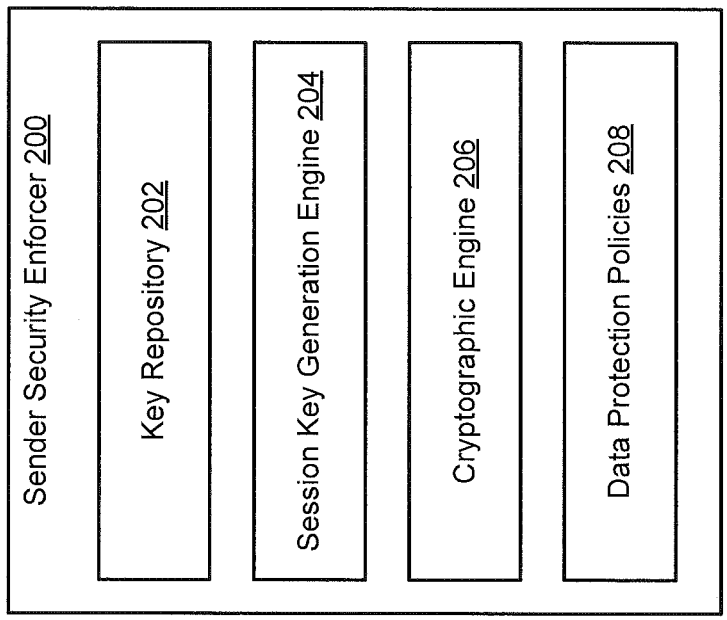
FIG. 2 shows a sender security enforcer in accordance with one or more embodiments of the invention.

FIG. 2 shows a sender security enforcer in accordance with one or more embodiments of the invention. The sender security enforcer (200) includes a key repository (202), a session key generation engine (204), a cryptographic engine (206) and data protection policies (208).

The key repository (202) includes sender compartmentalization keys, and may include sender session keys (see FIG. 3). The session key generation engine (204) is configured to generate sender session keys and store the sender session keys in the key repository (202) based on policies. In one embodiment of the invention, the sender session keys are stored in the key repository (202) in encrypted form using a local master key. The cryptographic engine (206) is configured to encrypt data (or portions thereof) using the sender session key and to generate a data passport in accordance with FIG. 4. The data protection policies (208) specify which data and/or data elements within the data to protect using the sender session key(s) as well as whether the sender session key is stored in the repository or only sent with the protected data itself on the data passport portion of it. The data protection policies may be set by any suitable entity, such as a security professional or other individual, the owner of the data, the owner of the system, etc. In one or more embodiments, the data protection policies may be set up without knowledge of the system architecture or even the location(s) where the data may ultimately be saved.

While FIG. 2 shows a sender security enforcer, a receiver security enforcer is similar to the sender security enforcer in that it also includes a key repository and a cryptographic engine. However, the content of the key repository in the receiver security enforcer is different than the content of key repository (202) and is described with respect to FIG. 5.

FIG. 3 shows data structures in accordance with one or more embodiments of the invention.

As shown in FIG. 3, the key repository (300) (which corresponds to the key repository in the KMS (100)) includes (i) KMS keys (306), (ii) sender compartmentalization keys (312), and (iii) receiver compartmentalization keys (318). All the keys in the repository are protected by one or more master keys that may be unique to specific senders and/or receivers. The master keys and KMS side cryptographic functions using them may be processed using hardware security modules (e.g., FIPS 140-2 Level 3 or 4 compliant, etc.).

Each KMS key (DK) (306) is associated with a timestamp (308) and an index (DK index) (310). The timestamp (308) specifies when the particular DK expires and the DK index uniquely identifies the DK from all other DKs (or all other keys) in the key repository. The DKs are not sent 'as is' to either the sender system or the receiver system. The DKs may be stored in encrypted form using a KMS master key.

Each sender compartmentalization key (SK) (312) is associated with a timestamp (314) and an index (SK index) (316). The timestamp (314) specifies when the particular SK expires and the SK index uniquely identifies the SK from all other SKs (or all other keys) in the key repository. Each SK is only received from a sender's security enforcer component (or sent to the appropriate sender security enforcer if the policy permits). The SKs are stored in encrypted form using a local master key. The local master key may be unique to the sender system.

Each receiver compartmentalization key (RK) (318) is associated with a timestamp (320) and an index (RK index) (322). The timestamp (320) specifies when the particular RK expires and the RK index uniquely identifies the RK from all other RKs (or all other keys) in the key repository. The RKs are stored in encrypted form using a local master key. The local master key may be unique to the receiver system.

The sender key repository (302) (which is associated with the sender security enforcer) includes sender compartmentalization keys (SK) (312) and optionally sender session keys (324) if policy permits along with the corresponding timestamps and indices.

The receiver key repository (304) (which is associated with the receiver security enforcer) receiver compartmentalization keys (RK) (318) and optionally includes receiver session keys (326) if policy permits along with the corresponding timestamps and indices.

In one embodiment of the invention, the keys described in FIG. 3 are generated at random times. Further, each of the KMS, sender systems and receiver systems may generate one or more of the keys at different times, where the times are randomly selected by the individual systems.

In one embodiment of the invention, prior to being used to encrypt data transmitted between a sender system and a receiver system, the SK and the RK must be transmitted to the KMS. The following describes a method for transmitting an SK from the sender system to the receiver system in accordance with one embodiment of the invention. The receiver system may use the same method for transmitting the RK to the KMS.

Initially, the KMS and the sender system mutually authenticate each other, for example, using certificates. Once authenticated, an SSL/TLS tunnel is established between the KMS and the sender system. The KMS subsequently selects (e.g., randomly) and sends a DK to the sender system via the SSL/TLS tunnel. The sender system XORs the DK sent from the KMS and a randomly selected SK to obtain a protected SK. The protected SK is then transmitted to the KMS (optionally over the SSL/TLS tunnel). Upon receipt of the protected SK, the SK is extracted from the protected SK by applying an XOR function to the protected SK along with the DK. The extracted SK is then encrypted with a KMS master key and stored in the KMS key repository (108 in FIG. 1) along with an index and a timestamp.

FIG. 4 shows a flowchart in accordance with one or more embodiments of the invention. The steps shown in FIG. 4 may be executed by, for example, a computer processor of any suitable computing device or devices, such as those described with respect to FIG. 6. Further, the computing device or devices may be the same as or different than those used by the steps described with respect to FIG. 5. While the various steps in this flowchart are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 2 should not be construed as limiting the scope of the invention.

Turning to FIG. 4, in step 400, data is received (or intercepted) by the sender security enforcer, where an application is attempting to send the data to a receiver system (or an application executing thereon).

In Step 402, one or more data elements in the data are identified using one or more data protection policies. In one embodiment of the invention, the data may be a single data element or may be a set of data elements. Further, all or only a subset of the data elements in the data may be identified as requiring encryption.

In Step 404, the data elements identified in Step 402 are encrypted using a sender session key(s). In one embodiment of the invention, the sender session key is generated after the data elements have been identified in Step 402. Alternatively, the sender session key is generated prior to the data elements being identified. In one embodiment of the invention, the sender session key is generated based on one or more data protection policies. In one embodiment of the invention, the cryptographic engine in the sender security enforcer is configured to select a sender session key(s) from the sender key repository and encrypt the data element(s) using the selected sender session key(s). In one embodiment of the invention, the sender session key(s) is randomly selected.

In Step 406, a receiver key value and corresponding indices are requested from the key management system (KMS). In one embodiment of the invention, the receiver key value is generated by applying an XOR function to a KMS key (DK) and a receiver compartmentalization key (RK). Further, the indices correspond to the DK index associated with the DK and the RK index associated with the RK. In one embodiment of the invention, the KMS may select any non-expired DK and RK. In one embodiment of the invention, the KMS authenticates the sender system (or sender security enforcer) before servicing the request. The authentication may be performed using PKI or symmetric key infrastructure.

In Step 408, the protected receiver key value and the corresponding indices are received from the KMS. In one embodiment of the invention, the KMS may also send the time stamps associated with the DK and RK to the sender system. In Step 410, a non-expired sender compartmentalization key (SK) is randomly selected from the sender key repository. In Step 412, a combined key is generated using the SK and the receiver key value. In one embodiment of the invention, the combined key is generated by applying an XOR function to the SK and protected receiver key value.

In Step 414, the session key(s) is encrypted using the combined key to generate an encrypted session key(s). In Step 416, a data passport is generated using the encrypted session key(s), the DK index, the RK index, and the SK index. In one embodiment of the invention, the SK index is obtained from the sender key repository and corresponds to the SK. In Step 418, protected data is generated using the data passport, the encrypted data elements and, if present, any unencrypted data elements. In one embodiment of the invention, the data passport is appended to the encrypted data elements and, if present, any unencrypted data elements. In Step 420, the protected data is transmitted to the receiver system.

While FIG. 4 describes using a single session key to encrypt all identified data elements in a particular data, the invention is not limited to this embodiment. Specifically, embodiments of the invention may be implemented using a different session key and a different combined key for each identified data element. Further, embodiments of the invention may be implemented using a different session key and a different combined key for each subset of identified data element, where each subset may include one or more identified data elements. If multiple session keys and combined keys are used to protect data, then the appropriate number of encrypted session keys and key indices are included in the data passport.

FIG. 5 shows a flowchart in accordance with one or more embodiments of the invention. The steps shown in FIG. 5 may be executed by, for example, a computer processor of any suitable computing device or devices, such as those described with respect to FIG. 6. Further, the computing device or devices may be the same or different than those used by the steps described with respect to FIG. 4. While the various steps in this flowchart are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 2 should not be construed as limiting the scope of the invention.

Turning to FIG. 5, in step 500, protected data is received by the receiver security enforcer. In Step 502, the data passport is extracted from the protected data. In Step 504, the indices (i.e., DK Index, SK Index, and RK Index) are extracted from the data passport. In Step 506, the DK index and the SK index are sent to the KMS. In one embodiment of the invention, the DK index and the SK index are sent to the KMS in a request for a sender key value. In one embodiment of the invention, the KMS authenticates the receiver system (or receiver security enforcer) before servicing the request. The authentication may be performed using PKI or symmetric key infrastructure.

In Step 508, a protected sender key value is obtained from the KMS. The KMS may use an XOR function between the selected DK and SK to create a protected SK value. In Step 510, RK is obtained from the receiver key repository using the RK Index. In Step 512, a combined key is generated using the RK and the protected sender key value. In one embodiment of the invention, the combined key is generated by applying an XOR function to the RK and the protected sender key value. In Step 514, the encrypted session key is obtained from the data passport. In Step 516, the encrypted session is decrypted using the combined key generated in setup 512. In Step 518, the encrypted data elements in the protected data are identified.

In Step 520, the session key(s) (obtained in step 516) is used to decrypt the data elements identified in Step 518. In Step 522, the data is generated by combining the data elements obtained in Step 520 and, if present, unencrypted data elements in the protected data. In Step 524, the data is transmitted to the appropriate application on the receiver system.

Embodiments of the invention may be implemented using any key length and any cryptographic function. Further, the key lengths for the individual keys used in the invention do not have to be uniform. In addition, different cryptographic functions may be used for different data (or portions thereof) and/or different cryptographic functions may be used to encrypt the various session keys.

In general, one or more embodiments of the invention enable the exchange of data only between the sender of data and the intended recipient of the data without the two parties having to perform a direct key exchange between them, and without them having to identify each other. In one or more embodiments of the invention, if the protected data falls into the wrong hands, it may be completely unusable by the malicious third party. Because embodiments of the invention do not require the two parties of data exchange to communicate directly for key exchange or authentication, an attacker is unable to compromise the system when eavesdropping on communications between the two parties as no key exchange or authentication occurs between the two parties.

In one or more embodiments of the invention, the keys being used are dynamically exchanged, short lived, and are made of ad-hoc combinations of short lived key components randomly combined with each data exchange. This makes it extremely hard and non-cost effective to attack the system using brute force methods. In particular, attempting to compromise the system may require breaking into and eavesdropping on three different, completely unrelated channels on an ongoing basis in real time.

In one or more embodiments of the invention, given the dynamic and ad-hoc nature of the keys the need for hardware cryptography is less crucial than traditional key exchange facilities. Moreover, in various embodiments of the invention, the senders and recipients of data obtain the components they need for any exchange just prior to using them, they do not store them and do not communicate them.

Figure 6:
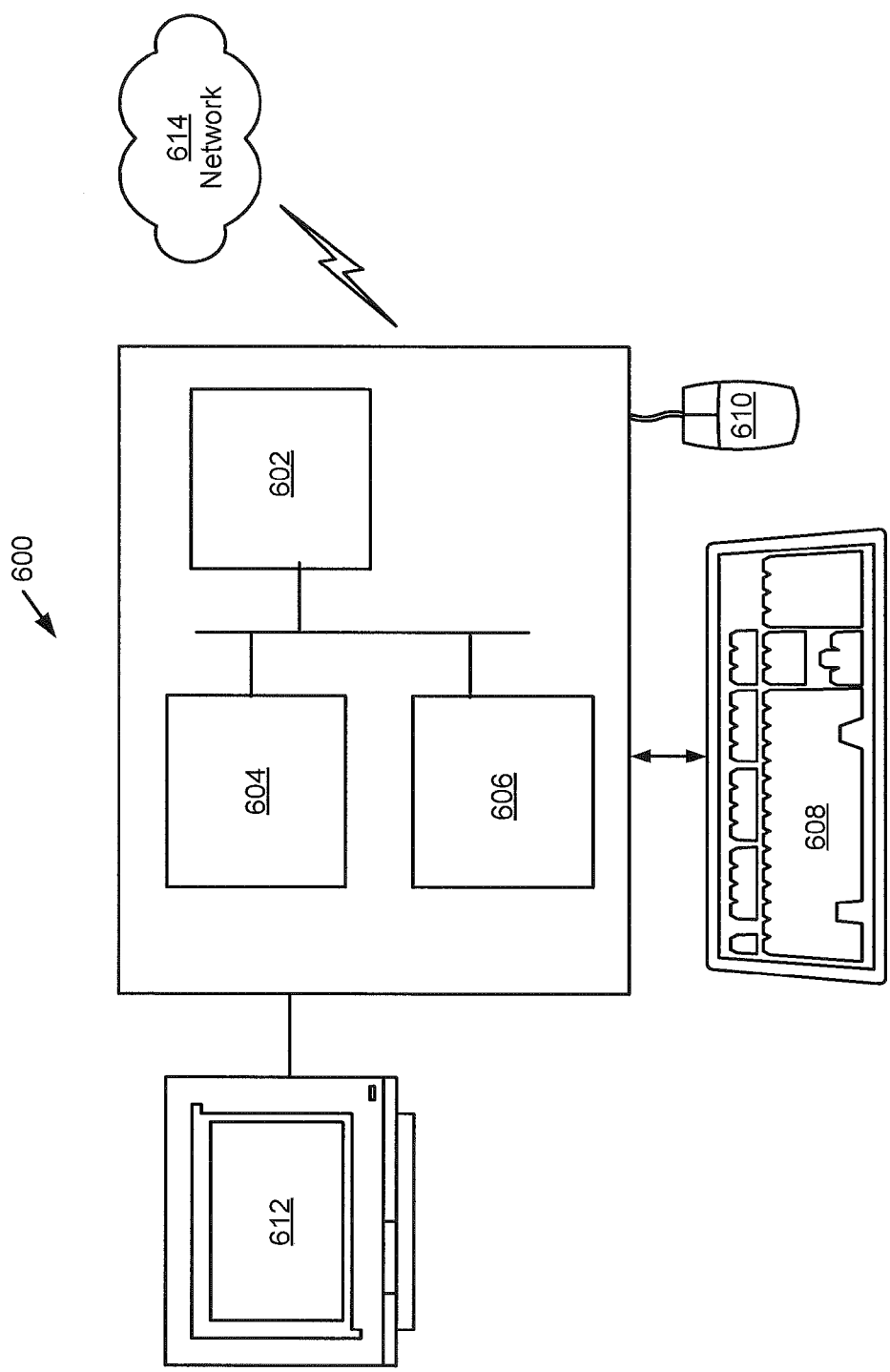
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input devices, such as a keyboard (608), via a network (614), a mouse (610), or a microphone (not shown). Further, the computer (600) may include output means, such as a monitor (612) (e.g., a liquid crystal display (LCD), a plasma display, or cathode ray tube (CRT) monitor) and via the network (614). The computer system (600) may be connected to a network (614) (e.g., a local area network (LAN), a wide area network (WAN) such as the Internet, or any other similar type of network) via a network interface connection (not shown). In one or more embodiments, the network interface connection allows communication between the computer system (600) in a manner to allow the data structures shown and described in FIG. 3 to be used by, stored within, and possibly transferred across the network (614), in whole or in part. Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting data, comprising:
   receiving the data;
   identifying, by a sender system, a first data element in the data to protect;
   encrypting, by the sender system, the first data element with a sender session key;
   generating, by the sender system, a combined key using a receiver key value and a sender compartmentalization key (SK);
   encrypting, by the sender system, the sender session key using the combined key to obtain an encrypted session key;
   generating, by the sender system, a data passport comprising the encrypted session key, a dictionary classification key (DK) index, a SK index, and a receiver compartmentalization key (RK) index;
   generating, by the sender system, protected data comprising the data passport and the encrypted first data element; and
   transmitting, by the sender system and across a network, the protected data to a receiver system.

2. The method of claim 1, further comprising:
   sending a request to a key management system (KMS) for the receiver key value.

3. The method of claim 2, further comprising:
   receiving, in response to the request, the combined key, the DK index, and the RK index.

4. The method of claim 3, wherein the request is sent by a sender security enforcer and wherein the sender security enforcer is authenticated by the KMS prior to the KMS processing the request.

5. The method of claim 2, wherein the request is sent by a sender security enforcer and wherein the sender security enforcer is authenticated by the KMS prior to the KMS processing the request.

6. The method of claim 1, wherein the receiver key value is generated by applying an XOR function to a DK and a RK, wherein the DK is associated with the DK index and the RK is associated with the RK index.

7. The method of claim 6, wherein the DK is associated with a time stamp and wherein the DK may only be used if the time stamp indicates that the DK is not expired.

8. The method of claim 7, wherein a key management system (KMS) randomly selects the DK and the RK from a key repository.

9. The method of claim 6, wherein a key management system (KMS) randomly selects the DK and the RK from a key repository.

10. The method of claim 1, wherein generating the combined key comprises applying an XOR function to the receiver key value and the SK.

11. The method of claim 1, wherein the data comprises the first data element and a second data element, wherein the second data element is not encrypted with the sender session key.

12. The method of claim 11, wherein the protected data further comprises the second data element.

13. A non-transitory computer readable storage medium comprising computer readable code for sending data, the computer readable code when executed comprises functionality to:
   receive the data;
   identify a data element in the data to protect;
   encrypt the data element with a sender session key;
   generate a combined key using a receiver key value and a sender compartmentalization key (SK);
   encrypt the sender session key using the combined key to obtain an encrypted session key;
   generate a data passport comprising the encrypted session key, a dictionary classification key (DK) index, a SK index, and a receiver compartmentalization key (RK) index;
   generate protected data comprising the data passport and the encrypted data element; and
   transmit the protected data to a receiver system.

14. The non-transitory computer readable storage medium of claim 13, the computer readable code when executed further comprising functionality to perform a method for transmitting data, comprising:
   receiving the data;
   identifying, by a sender system, a first data element in the data to protect;
   encrypting, by the sender system, the first data element with a sender session key;
   generating, by the sender system, a combined key using a receiver key value and a sender compartmentalization key (SK);
   encrypting, by the sender system, the sender session key using the combined key to obtain an encrypted session key;
   generating, by the sender system, a data passport comprising the encrypted session key, a dictionary classification key (DK) index, a SK index, and a receiver compartmentalization key (RK) index;
   generating, by the sender system, protected data comprising the data passport and the encrypted first data element;
   transmitting, by the sender system and across a network, the protected data to a receiver system; and
   sending a request to a key management system (KMS) for the receiver key value.

15. A method for receiving protected data, comprising:
   receiving, by a receiver system via a network and from a sender system, the protected data comprising a data passport and an encrypted data element;
   obtaining, by the receiver system, a dictionary classification key (DK) index and a sender compartmentalization key (SK) index from the data passport;
   sending, by the receiver system and across the network, a request for a sender key value to a key management system (KMS), wherein the request comprises the DK index and the SK index;

receiving, by the receiver system via a network and in response to the request, the sender key value;

obtaining, by the receiver system, the receiver compartmentalization key (RK) from a receiver key repository using an RK index, wherein the RK index is obtained from the data passport;

generating, by the receiver system, a combined key using the sender key value and the RK;

decrypting, by the receiver system, an encrypted session key using the combined key to obtain a session key;

decrypting, by the receiver system, the encrypted data element to obtain a data element using the session key;

generating, by the receiver system, data using the data element; and transmitting the data to an application on the receiver system.

16. The method of claim 15, wherein the request is sent by a receiver security enforcer and wherein the receiver security enforcer is authenticated by the KMS prior to the KMS processing the request.

17. The method of claim 15, wherein the sender key value is generated by applying an XOR function to a DK and a SK, wherein the DK is associated with the DK index and the SK is associated with the SK index.

18. The method of claim 15, wherein the receiver key repository is located on the receiver system.

19. The method of claim 15, wherein generating the combined key comprises applying an XOR function to the sender key value and the RK.

20. The method of claim 15, wherein the DK index is an integer.

21. The method of claim 15, wherein a key management system generates the RK and transmits the RK to the receiver key repository.

22. The method of claim 15, wherein the DK and the SK are not transmitted to the receiver system.

23. A non-transitory computer readable storage medium comprising computer readable code for receiving protected data, the computer readable code when executed comprises functionality to:

receive the protected data comprising a data passport and an encrypted data element;

obtain a dictionary classification key (DK) index and a sender compartmentalization key (SK) index from the data passport;

send a request for a sender key value to a key management system (KMS), wherein the request comprises the DK index and the SK index;

receive, in response to the request, the sender key value;

obtain the receiver compartmentalization key (RK) from a receiver key repository using an RK index, wherein the RK index is obtained from the data passport;

generate a combined key using the sender key value and the RK;

decrypt an encrypted session key using the combined key to obtain a session key;

decrypt the encrypted data element to obtain a data element;

generate data using the data element; and transmit the data to an application on a receiver system.

24. The non-transitory computer readable storage medium of claim 23, the computer readable code when executed further comprising functionality to perform a method for receiving protected data, comprising:

receiving, by a receiver system via a network and from a sender system, the protected data comprising a data passport and an encrypted data element;

obtaining, by the receiver system, a dictionary classification key (DK) index and a sender compartmentalization key (SK) index from the data passport;

sending, by the receiver system and across the network, a request for a sender key value to a key management system (KMS), wherein the request comprises the DK index and the SK index;

receiving, by the receiver system via a network and in response to the request, the sender key value;

obtaining, by the receiver system, the receiver compartmentalization key (RK) from a receiver key repository using an RK index, wherein the RK index is obtained from the data passport;

generating, by the receiver system, a combined key using the sender key value and the RK;

decrypting, by the receiver system, an encrypted session key using the combined key to obtain a session key;

decrypting, by the receiver system, the encrypted data element to obtain a data element using the session key;

generating, by the receiver system, data using the data element;

transmitting the data to an application on the receiver system; and wherein the request is sent by a receiver security enforcer and wherein the receiver security enforcer is authenticated by the KMS prior to the KMS processing the request.

* * * * *